United States Patent [19]

Iwama et al.

[11] Patent Number: 4,737,629
[45] Date of Patent: Apr. 12, 1988

[54] AUTOMATIC WINDSCREEN DEFOGGER

[75] Inventors: Shinji Iwama, Kariya; Mamoru Shimamoto; Hiroshi Ishikawa, both of Nagoya, all of Japan

[73] Assignee: Nippondenso Co., Ltd., Kariya, Japan

[21] Appl. No.: 864,864

[22] Filed: May 20, 1986

[30] Foreign Application Priority Data

May 21, 1985 [JP] Japan ............... 60-109106

[51] Int. Cl.$^4$ ............... G01D 5/34
[52] U.S. Cl. ............... 250/231 R; 73/336.5; 219/203; 356/448
[58] Field of Search ............... 219/203; 350/588; 356/445, 448; 73/336.5; 250/231 R

[56] References Cited

U.S. PATENT DOCUMENTS

| | | | |
|---|---|---|---|
| 3,926,052 | 12/1975 | Bechtel | 73/336.5 |
| 3,947,131 | 3/1976 | Karl | 356/445 |
| 4,355,271 | 10/1982 | Noack | 318/483 |
| 4,538,064 | 8/1985 | Kovacs | 250/231 R |
| 4,636,643 | 1/1987 | Nakamura et al. | 356/448 |
| 4,636,698 | 1/1987 | Leclercq | 219/203 |

FOREIGN PATENT DOCUMENTS 59-108939  6/1984  Japan.
60-27842   2/1985  Japan.

Primary Examiner—Patrick R. Salce
Assistant Examiner—Jeffrey Sterrett
Attorney, Agent, or Firm—Cushman, Darby & Cushman

[57] ABSTRACT

A control system for discriminating the occurrence of fogging of the windscreen of a vehicle due to the deposition of water drops or the like from the degree of optical scattering and automatically starting and stopping the operation of a defogging apparatus according to the result of the discrimination. To prevent the defogging apparatus from being stopped undesirably due to an optical system being subjected to the effect of a disturbance light, the disturbance light is detected so that when the disturbance light exceeds a predetermined value, the defogging apparatus is maintained in operation.

12 Claims, 4 Drawing Sheets

AUTOMATIC WINDSCREEN DEFOGGER

BACKGROUND OF THE INVENTION

1. Field of the Invention

The present invention relates to a control system for vehicle windscreen defogging apparatus. More particularly, the invention relates to an automatic defogging control system for the windscreen of a vehicle in which optical means includes light emitting means for radiating a light beam toward the windscreen of a vehicle and photosensitive means for receiving the light beam reflected from the windscreen whereby when the windscreen becomes foggy due to water drops or the like sticking to the windscreen, the degree of an optical scattering caused by the foggy portion is determined from the magnitude of a photosensitive signal derived from the optical means and a defogging apparatus is operated or stopped in accordance with the result of the determination.

2. Description of the Prior Art

An automatic defogging control system of this type is known in the art by for example Japanese Unexamined Patent Publication No. 59-108939.

With this known system, when the windscreen becomes foggy so that the light beam projected to and reflected from the inner surface of the vehicle windscreen is scattered in an increased degree in other directions than in the direction of the photosensitive means, the magnitude of a photosensitive signal generated from the photosensitive means is decreased. When the photosensitive signal becomes lower than a predetermined value, the operation of the defogging apparatus is started. When the fogging is gradually eliminated by the operation of the defogging apparatus so that the degree of scattering is decreased, the magnitude of a photosensitive signal is increased and the operation of the defogging apparatus is stopped when the magnitude exceeds the predetermined value.

With the control apparatus constructed as described above, in a condition where the defogging apparatus is operated upon the occurrence of fogging and the fogging is not eliminated fully as yet, if any disturbance light such as the sunlight enters the photosensitive means, sensible frequency components of the disturbance light act to increase the magnitude of a photosensitive signal. As a result, the defogging apparatus is stopped despite the presence of the fogging. If the entry of the disturbance light is of a temporary nature, while the defogging apparatus is operated again, the fogging is not rapidly eliminated so that the stop-start operation of the defogging apparatus is repeated wastefully and the durability of the apparatus is deteriorated. If the entry of the disturbance light continues over a long period of time, the defogging effect cannot be expected at all.

SUMMARY OF THE INVENTION

With a view to overcoming the foregoing deficiencies in the prior art, it is an object of the present invention to provide an automatic defogging control system for the windscreen of a vehicle which is capable of positively operating a defogging apparatus during the occurrence of fogging.

It is another object of the invention to provide an automatic defogging control system which is capable of stopping a defogging apparatus without delay upon the elimination of fogging.

To accomplish the above objects, in accordance with tne invention there is thus provided an automatic defogging control system including, as shown in FIG. 1, light emitting means LED for intermittently radiating a light beam toward a vehicle windscreen WS, photosensitive means LRD arranged to receive the light beam reflected from the vehicle windscreen WS and generate a photosensitive signal, first comparing means whereby when the light emitting means LED is radiating the light beam the magnitude of a photosensitive signal generated from the photosensitive means is compared with a first preset value $TH_1$ so that an operation start signal $S_1$ is generated when the magnitude is smaller than the first predetermined value $TH_1$ and an operation stop signal $S_2$ when the magnitude is greater than the first predetermined value $TH_1$, second comparing means whereby when the light emitting means LED is not radiating the light beam the magnitude of a photosensitive signal generated from the photosensitive means LRD is compared with a second predetermined value $TH_2$ so that an operation holding signal $S_3$ is generated when the magnitude is greater than the second predetermined value $TH_2$ and an operation enable signal $S_4$ is generated when the magnitude is smaller than the second predetermined value $TH_2$, and operation logic means whereby a defogging apparatus DF is operated when the operation start signal $S_1$ is generated, the defogging apparatus DF is stopped when the operation stop signal $S_2$ is generated in the presence of the operation enable signal $S_4$ and the defogging apparatus DF is maintained in operation if it is in operation when the operation holding signal $S_3$ is generated.

With this construction, the first comparing means, the second comparing means and the operation logic means are operated in time sequence in association with the intermittent operation of the light emitting means LED and therefore they may be advantageously provided by means including a memory, e.g., a digital computer operable in accordance with a microprogram.

Also, suitable timing means TM may be provided so that the first and second comparing means perform comparison operations in synchronism with the intermittent operation of the light emitting means LED.

The light emitting means LED is not limited to one which repeatedly emits light and completely cuts off the light and it may be such that the ordinary light and weak light are alternately emitted repeatedly.

With the above-described construction, when the light emitting means is emitting the light, the magnitude of a photosensitive signal generated from the photosensitive means is compared with the first predetermined value by the first comparing means. Also, when the light emitting means is in its nonemitting condition, the magnitude of a photosensitive signal generated from the photosensitive means is compared with the second predetermined value by the second comparing means. In this case, the second comparing means recognizes the magnitude of the photosensitive signal in the nonemitting condition of the light emitting means as the magnitude of a disturbance whereby when the magnitude exceeds the second predetermined value, the second comparing means generates an operation holding signal indicating that the magnitude of the disturbance is not desirable for fogging detecting purposes.

Where no operation holding signal is generated (in the presence of an operation enable signal), that is, when it is determined that there is no effect of any disturbance, the operation logic circuit considers the comparison result of the first comparing means as effective and controls the defogging apparatus in accordance with the comparison result. What is particularly important is the fact that the operation of the defogging apparatus is not stopped in the presence of the operation holding signal. In other words, this is done for the purpose of preventing the defogging apparatus from being stopped inadvertently due to an extremely high degree of possibility that the magnitude of the photosensitive signal in the emitting condition of the light emitting mean is apparently increased by the disturbance.

On the other hand, when no operation holding signal is generated, it is considered that there is no effect of any disturbance, that is, the operation logic means stops the defogging apparatus when the first comparing means generates an operation stop signal in response to the restoration of a photosensitive signal. As a result, when there is no effect of any disturbance, the defogging apparatus is rapidly stopped upon elimination of the fogging and thus the defogging apparatus is prevented from being continuously operated wastefully in the ordinary operating conditions.

DESCRIPTION OF THE PREFERRED EMBODIMENTS

Figure 1:
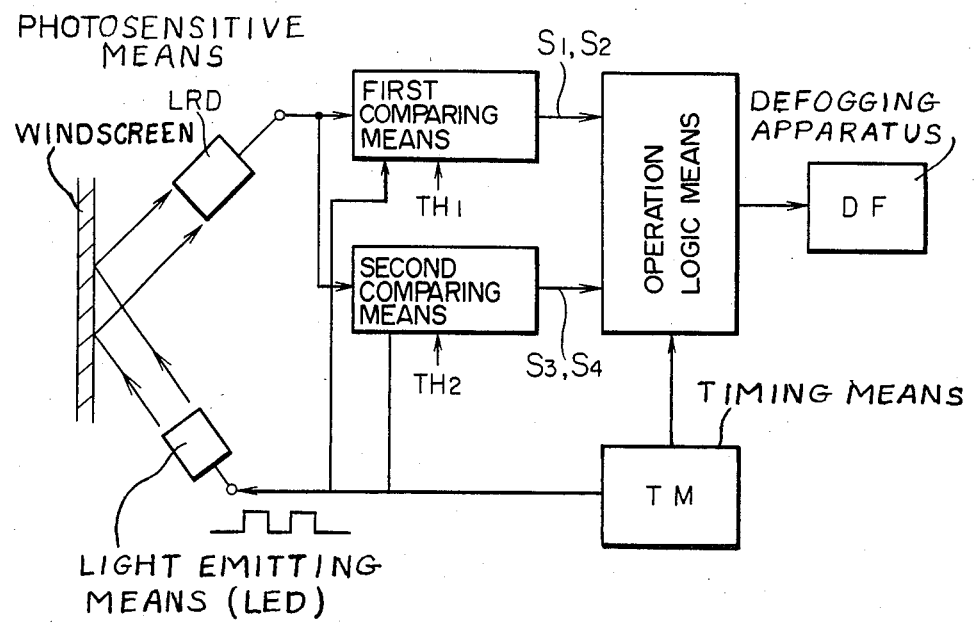
FIG. 1 is a block diagram showing a constructional feature of the present invention.
Figure 2:
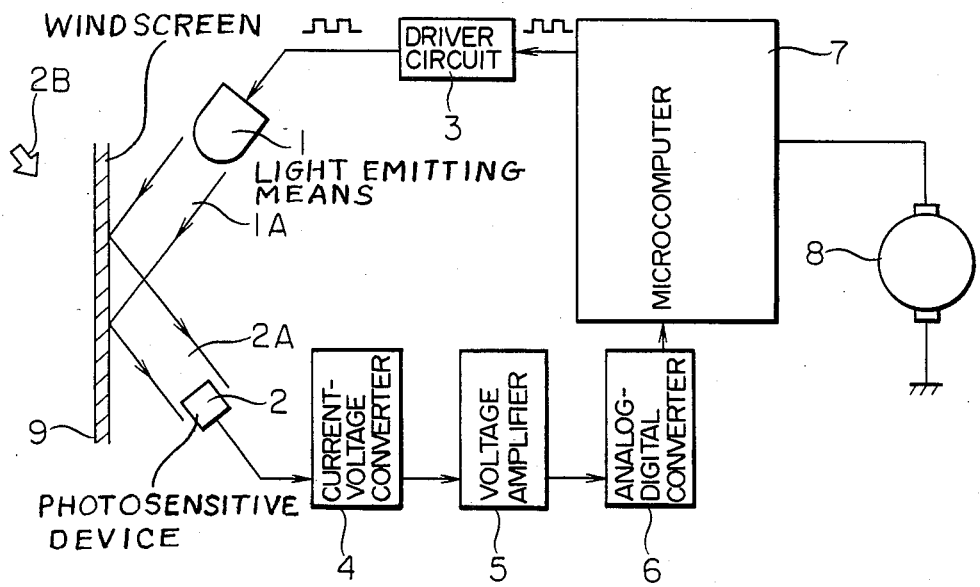
FIG. 2 is a block diagram showing the construction of an embodiment of the invention.

Referring to FIG. 2 showing an embodiment of the invention, a light emitting device 1 is arranged to radiate a light beam 1A toward a vehicle windscreen 9. A photosensitive device 2 is arranged to receive the light beam radiated from the light emitting device 1 and reflected from the vehicle windscreen 9.

The light emitting device 1 includes for example a light emitting diode and it receives the electric power required for the emission of light from a driver circuit 3 connected to a microcomputer 7. The photosensitive device 2 includes for example a photodiode or phototransistor whereby a current of a magnitude corresponding to the intenaity of received light including the reflected light beam 2A and a disturbance light 2B is generated as a photosensitive signal and applied to a current-voltage conversion circuit 4.

The current-voltage conversion circuit 4 generates a voltage signal corresponding to the magnitude of the current from the photosensitive device 2 and applied it to a voltage amplifier circuit 5. The voltage amplifier circuit 5 amplifies the received voltage signal and applies it to an analog-digital conversion circuit 6. The analog-digital conversion circuit 6 generates a binary coded signal (digital signal) proportional to the magnitude of the applied voltage signal and the thus generated digital signal is applied to the microcomputer 7.

A defogging apparatus 8 includes for example an electric motor for blowing air to the vehicle windscreen 9. In this case, the vehicle air conditioner itself may be used as the defogging apparatus 8 so that the blower motor is operated and the defrosting air outlet of the air conditioner is opened by an electromechanical actuator (not shown).

Figure 3:
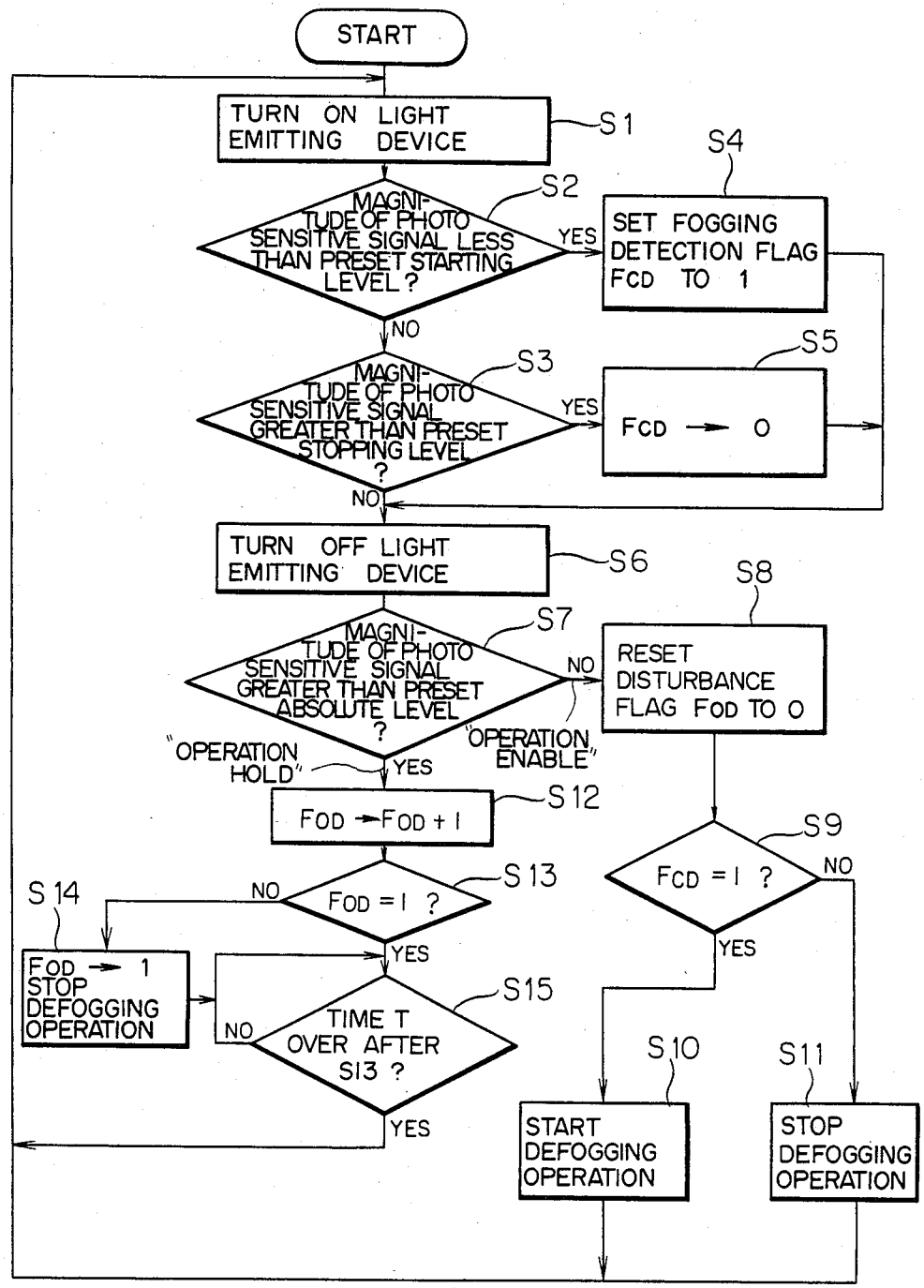
FIG. 3 is a flow chart showing a control program of the microcomputer shown in FIG. 2.

The microcomputer 7 executes the control program shown in FIG. 3 in response to the connection of the automatic defogging control system to its power source, e.g., the closing of the vehicle key switch in the following manner. (1) The microcomputer 7 receives from the analog-digital conversion circuit 6 a digital signal indicative of the magnitude of the photosensitive signal from the photosensitive device 2 so that the magnitude is estimated and the start and stop of the defogging apparatus 8 are controlled in accordance with the result of the estimation. (2) In estimating the magnitude of a photosensitive signal, an emission activating signal is applied intermittently to the driver circuit 3 so that a photosensitive signal obtained during the light emission and a photosensitive signal obtained in the nonemission condition are separately estimated and the results of the estimations are subjected to logical decisions thereby determining the presence or absence of fogging.

The operation of the system will now be described in accordance with the constitution of the control program. The microcomputer 7 starts the execution of the program at a power-on start step so that at a step S1, an emission activating signal is first applied to the driver circuit 3 and the light emitting device 1 is operated.

Then, at steps S2 and S3, the magnitude of a photosensitive signal in the emission condition of the light emitting device 1 is compared with predetermined preset levels. Taking as 100% the magnitude of a photosensitive signal generated by the photosensitive device 2 when the vehicle windscreen 9 is not fogged at all, these preset levels include a starting preset level corresponding to 75% and a stopping preset level corresponding to 87% and they are preliminarily stored in the ROM of the microcomputer 7. The starting preset level and the stopping preset level have different values so as to provide a fogging detecting point with a hysteresis and the two preset levels collectively represent a first preset value as stated in the appended claims.

If the magnitude of the photosensitive signal is determined less than the starting preset value at the step S2, a fogging detection flag $F_{CD}$ is set to 1 at a step S4. On the other hand, if the magnitude of the photosensitive signal is determined higher than the stopping preset level at the step S3, the fogging detection flag $F_{CD}$ is reset to 0 at a step S5. The fogging detection flag $F_{CD}$ is a data stored as either 1 or 0 in the RAM of the microcomputer 7. Since both of the steps S4 and S5 are passed when the results of the decisions at the steps S2 and S3 all result in NO, that is, when the magnitude of the photosensitive signal is intermediary between the two preset levels, the fogging detection flag $F_{CD}$ is maintained unchanged.

Then, at a step S6, the microcomputer 7 applies an extinction signal to the driver circuit 3 so as to stop the emission of the light emitting device 1. Then, at a step S7, the magnitude of a photosensitive signal generated in the nonemitting condition of the light emitting device 1 is compared with a predetermined absolute level. The value of this absolute level is preset as a value serving the purpose of determining that the magnitude of the photosensitive signal which should generally be about 0 in the nonemitting condition of the light emitting device 1 is increased by a disturbance such as the sunlight to such an extent that a detrimental effect is caused on the decision of the presence or absence of fogging in accordance with the magnitude of the photosensitive signal.

This value corresponds to a second preset value as stated in the appended claim. For instance, the predetermined absolute value is set to several % of the maximum output voltage (the saturation voltage) of the voltage amplifier circuit 5 for amplifying the photosensitive signal and it is preliminarily stored in the ROM of the microcomputer 7.

If the result of the decision at the step S7 shows that there is no disturbance, a disturbance detection flag $F_{OD}$ is reset to 0 at a step S8. The flag $F_{OD}$ is stored as a binary number indicating 0, 1 or 2 in the RAM of the microcomputer 7. Also, in response to the power-on start made by the start of the power supply to the microcomputer 7, the flag $F_{OD}$ is reset to 0.

At steps S9 to S11, the start and stop of operation of the defogging apparatus 8 are controlled when the result of the decision at the step S7 shows the absence of any effect of disturbance or an "operation enable" state. In other words, at a step S9, it is determined whether the fogging detection flag $F_{CD}$ is 0 or 1 so that if the flag $F_{CD}$ is 1 indicating the detection of the occurrence of fogging, a control signal for starting the operation of the defogging apparatus 8 is generated at a step S10. On the contrary, if the flag $F_{CD}$ is 0 indicating the absence of any fogging, a control signal for stopping the operation of the defogging apparatus 8 is generated at a step S11. In this case, the control signal indicative of the start or stop of the operation of the defogging apparatus 8 is for example generated by connecting one of the output ports with latch of the microcomputer 7 to the defogging apparatus 8 through a suitable buffer and changing a signal level appearing at the output port to 1 or 0.

If the result of the decision at the step S7 indicates the presence of the effect of any disturbance or an "operation hold" state, the disturbance detection flag $F_{OD}$ is incremented by 1 at a step S12. Then, at a step S13, it is determined whether the disturbance detection flag $F_{OD}$ is 1. In other words, it is determined whether the decision result indicating the "operation hold" is made for the first time following the decision result indicating the "operation enable". If the result of the decision is YES, the lapse of a predetermined time T is waited for at a step S15. During this time T, the range of execution of the program by the microcomputer 7 is limited and the steps S10 and S11 are not executed. What is important is the fact that the operation of the defogging apparatus 8 is not stopped at the step S11. In other words, during the "operation hold" period of the time T, the operation of the defogging apparatus 8 is not stopped even if the photosensitive signal increases over the stopping level and therefore there is no danger of the defogging apparatus 8 being stopped uselessly under the effect of any disturbance. Here, the "operation hold" time T may be selected to be several seconds, e.g., 5 seconds.

After the expiration of the "operation hold" time, the microcomputer 7 performs again the step S1 of the program. In the execution cycle of the program performed in succession to the step S1, the magnitude of the photosensitive signal is compared with the starting preset level, the stopping preset level and the given absolute level, respectively, thereby newly setting, resetting or incrementing the fogging detection flag $F_{CD}$ and the disturbance detection flag $F_{OD}$, respectively.

During the new execution cycle of the program, when the "operation enable" is determined at the step S7, both the stop and start of the defogging apparatus 8 are performed in dependence on the value of the fogging detection flag $F_{CD}$. Also, when the "operation hold" ensures, the disturbance detection flag $F_{OD}$ is incremented to 2 at the step S12 and the steps S13 and S14 are performed thereby setting the disturbance detection flag $F_{OD}$ to 1 and stopping the operation of the defogging apparatus 8. What is meant by the step S14 is the fact that if the disturbance-affected condition continues in excess of the predetermined time 1, the condition is considered to be abnormal so that the operation of the defogging apparatus 8 is stopped and it is held in a wait condition until the effect of the disturbance is eliminated.

Figure 4:
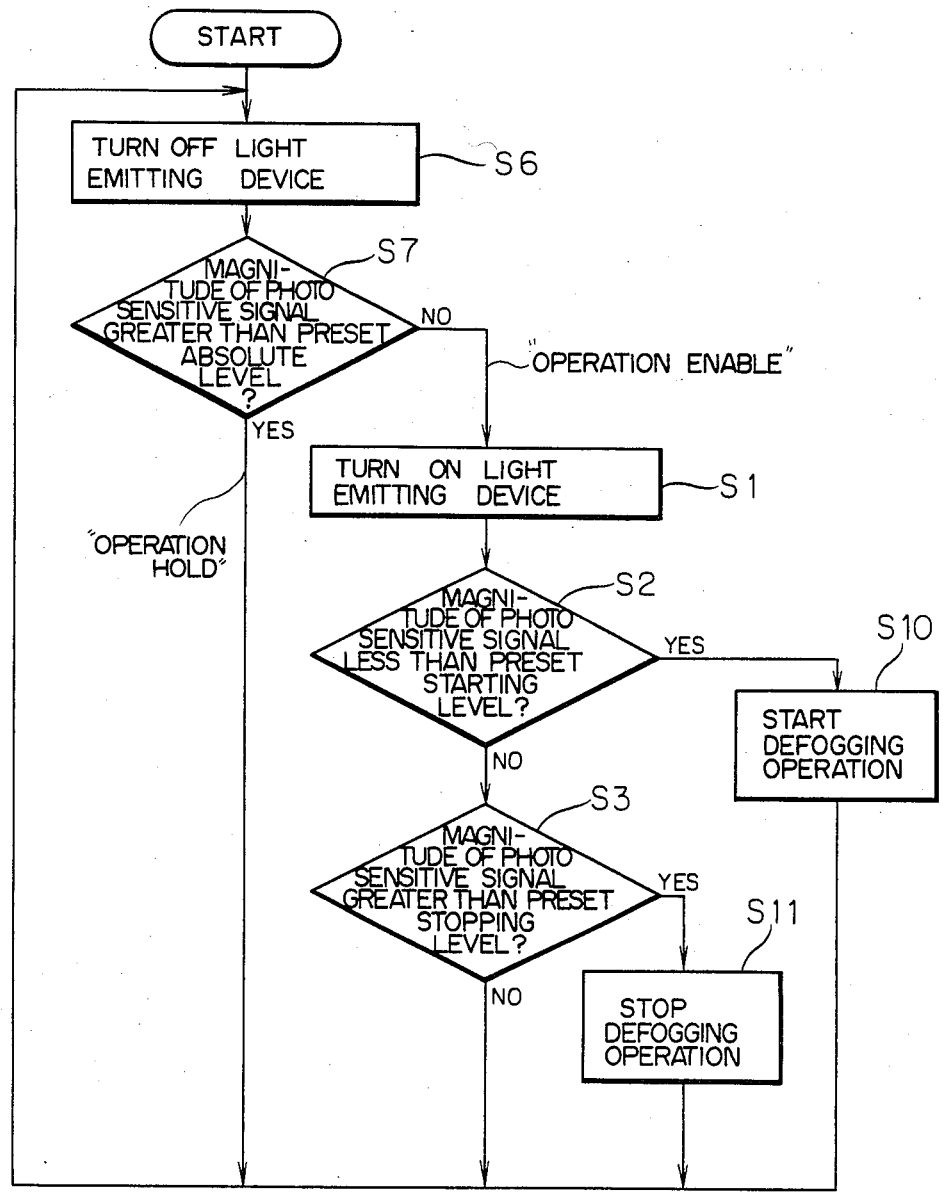
FIGS. 4 and 5 are flow charts showing modifications of the control program shown in FIG. 3.
Figure 5:
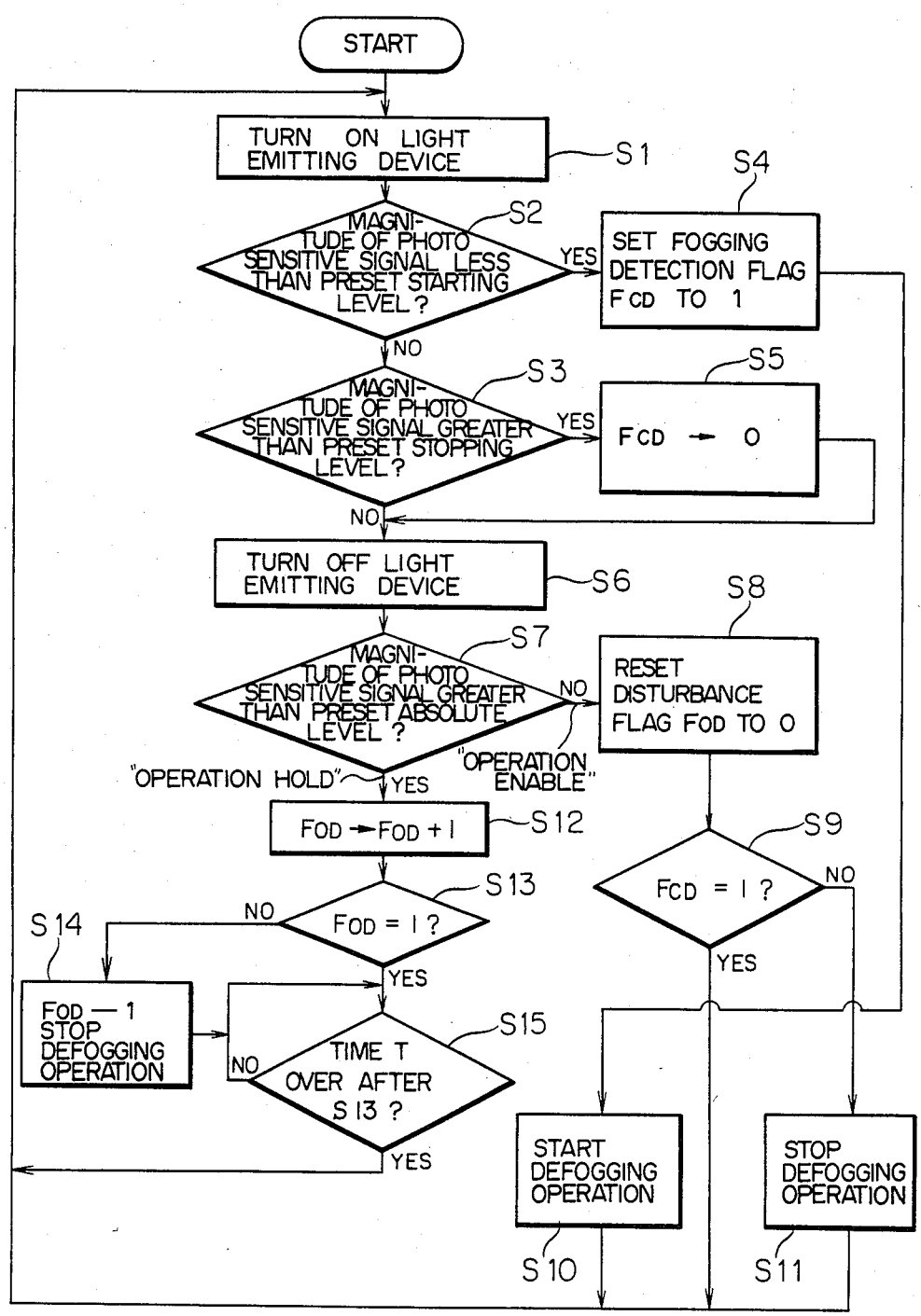

While the invention has been described with reference to one embodiment thereof, the invention is not limited to this embodiment alone. For instance, with the microcomputer 7, the constitution of its control program may be modified as shown in FIG. 4 or 5. In FIG. 4, each of the steps represents the same instruction as the step designated by the same symbol in FIG. 3 and the program of FIG. 4 differs from that of FIG. 3 only in that the use of the fogging detection flag $F_{CD}$ and the disturbance detection flag $F_{OD}$ is eliminated and that the "operation hold" is not limited to the time T.

With the control program shown in FIG. 5, the determination of the "operation enable" has an effect on the stopping of the defogging apparatus 8 but it does not have any bearing on starting the operation of the defogging apparatus 8.

Also, the invention may be applied to an automatic defogging control system for a vehicle rear windscreen using a heater as a defogging apparatus or alternatively the invention may be used in combination with a manual switch and a manual operating circuit (or a program) for manually starting and stopping the operation of a defogging apparatus of whatever type.

We claim:

1. An automatic control system for an apparatus for defogging a windscreen of a vehicle comprising:
    light emitting means for intermittently radiating a light beam toward said windscreen;
    photosensitive means for receiving said light beam reflected from said windscreen and generating a photosensitive signal corresponding to an intensity of said reflected light beam;
    operation commanding means for, under the application of an emission activating signal, comparing a magnitude of a photosensitive signal generated from said photosensitive means with a predetermined value and generating an operation command signal for operating said defogging apparatus when said magnitude is smaller than said predetermined value and generating a stop signal for stopping said defogging apparatus when said magnitude is greater than said predetermined value; and
    timing means for controlling said light emitting means and said operation commanding means, sid timing means including emission activating signal generating means for generating an emission activating signal when said light emitting means is in condition to radiate said light beam and synchronizing means for synchronizing said operation commanding means with the intermittent operation of said light emitting means.

2. An automatic control system according to claim 1 wherein said photosensitive means comprises a photodiode.

3. An automatic control system according to claim 1 wherein said photosensitive means comprises a phototransistor.

4. An automatic control system according to claim 1 wherein said light emitting means comprises means for alternately radiating light of different intensities.

5. An automatic control system according to claim 1 wherein said light emitting means comprises a light emitting device and means for driving said light emitting device.

6. An automatic control system according to claim 5 wherein said light emitting device comprises a light emitting diode.

7. An automatic control system according to claim 5 wherein said driving means comprises a driver circuit and a microcomputer for operating said driver circuit.

8. An automatic control system for an apparatus for defogging a windscreen of a vehicle comprising:
light emitting means for intermittently radiating a light beam toward said windscreen;
photosensitive means, arranged to receive said light beam reflected from said windscreen, for generating a photo signal corresponding to an intensity of said reflected light beam;
first comparing means for comparing, when said light emitting means is radiating said light beam, a magnitdue of said photo signal with a first predetermined value and generating an operation start signal when said magnitude is smaller than said first predetermined value and an operation stop signal when said magnitude is greater than said first predetermined value;
second comparing means for comparing, when said light emitting means is not radiating said light beam, a magnitude of said photo signal with a second predetermined value and generating an operation hold signal when said magnitude is greater than said second predetermined value and an operation enable signal when said magnitude is smaller than said second predetermined value; and
operation logic means for operating said defogging apparatus when said operation start signal is generated, stopping said defogging apparatus when said operation enable signal, and continuing to operate said defogging appartus when said defogging apparatus is in operation at the time of generation of said operation hold signal.

9. An automatic control system according to claim 8 wherein said light emitting means comprises a light emitting device and means for driving said light emitting device, and
wherein said photosensitive means comprises:
a photosensitive device arranged to receive said light beam reflected from said windscreen to generate a current signal corresponding to an intensity of said reflected light beam;
a current to voltage converter for generating a voltage signal proportional to the current signal provided by said photosensitive device;
an amplifier for amplifying the voltage signal provided by said current to voltage converter; and
an analog to digital converter for generating a digital signal indicative the magnitude of voltage provided by said amplifier.

10. An automatic control system for a windshield defogger, comprising:
a light emitting device for intermittently radiating a light beam toward a vehicle windscreen;
a driver circuit for driving said light emitting device in accordance with microcomputer generated instructions;
a photosensitive device, arranged to receive said light beam reflected from said windscreen, for generting a current signal corresponding to an intensity of said reflected light beam;
a current to voltage converter for generating a voltage signal proportional to the current signal provided by said photosensitive device;
an amplifier for amplifying the voltage signal provided by said current to voltage converter;
an analog to digital converter for generating a digital signal indicative the magnitude of voltage provided by said amplifier; and
microcomputer computer means receiving at an input thereof said digital signal and providing control instructions to said driver circuit and to said defogger, said microcomputer means including
means for comparing said digital signal with a first predetermined value and generating a start signal when the digital signal represents a value smaller than said first predetermined value and generating a stop signal when the value of said digital signal is greater than said first predetermined value, and
means for comparing, when said light emitting means is not radiating, the value of said digital signal with a second predetermined value and generating an operation hold signal when said digital signal value is greater than said second predetermined value and an operation enable signal when said digital signal value is less than said second predetermined value, and
means for operating said defogging apparatus when said start signal is generated, stopping said defogging apparatus when said stop signal is generated in the presence of said enable signal, and continuing to operate said apparatus when said hold signal is generated.

11. An automatic control system according to claim 10 wherein said microcomputer means comprise:
means for determining whether the value of said digital signal is less than said first predetermined level and if so, setting a fogging detection flag to "1", indicating a fogging condition;
means, if said value is not less than said first predetermined level, for determining whether said value is greater than a second predetermined level and if so, setting said fogging detection flag to "0" for turning off said light emitting device;
means in the event that said digital signal value is not greater than said second predetermined value or said fogging detection flag is "0" for turning off said light emitting means;
means for comparing said digital signal value with an absolute level indicating whether a fogging condition exists and setting a disturbance flag, capable of taking values "0", "1", and "2", to "0" if the value of said digital signal is not greater than said absolute level indicating an "enable" condition, to a value incremented by "1" over the previous flag value if the value of said digital signal is greater than said absolute level indicating a "hold" condition and to "0" upon start-up of said microcomputer means;
means for, after incrementing said disturbance flag, determining whether said disturbance flag is "1" and if so, timing a predetermined time period during which starting or stopping defogging is inhibited;

means for starting defogging when said defogging detection flag is "1"; and means for stopping defogging when said fogging detection flag is not "1".

12. An automatic control system according to claim 10 wherein said microcomputer means comprises:

means for determining whether the value of said digital signal is less than said first predetermined level and if so, setting a fogging detection flag to "1";

means, if said value is not less than said first predetermined level, for determining whether said value is greater than a second predetermined level and if so, setting said fogging detection flag to "0", the fogging detection flag determining, at least in part, how said microcomputer means operates said defogger.

* * * * *